United States Patent
Lee et al.

(10) Patent No.: US 10,387,005 B2
(45) Date of Patent: Aug. 20, 2019

(54) MONITORING APPARATUS IN ELECTRIC POWER SYSTEM

(71) Applicant: LSIS CO., LTD., Gyeonggi-do (KR)

(72) Inventors: Seok-Chan Lee, Gyeonggi-do (KR); Myung-Hwan Lee, Gyeonggi-do (KR); Seung-Ju Lee, Gyeonggi-do (KR); Yeo-Chang Yoon, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 386 days.

(21) Appl. No.: 15/351,833

(22) Filed: Nov. 15, 2016

(65) Prior Publication Data
US 2017/0205981 A1 Jul. 20, 2017

(30) Foreign Application Priority Data
Nov. 19, 2016 (KR) .................. 10-2016-0006620

(51) Int. Cl.
*G06F 3/0484* (2013.01)
*G06F 16/248* (2019.01)
(Continued)

(52) U.S. Cl.
CPC .............. *G06F 3/0484* (2013.01); *G06F 9/46* (2013.01); *G06F 11/3017* (2013.01);
(Continued)

(58) Field of Classification Search
CPC .................................................. G06F 3/0484
(Continued)

(56) References Cited

U.S. PATENT DOCUMENTS

| 6,292,822 B1* | 9/2001 | Hardwick ............... G06F 8/451 718/102 |
| 6,377,283 B1 | 4/2002 | Thomas |

(Continued)

FOREIGN PATENT DOCUMENTS

| CN | 1938705 A | 3/2007 |
| CN | 103839195 A | 6/2014 |

(Continued)

OTHER PUBLICATIONS

European Search Report dated Feb. 7, 2017 issued in corresponding the counterpart European Patent Application No. 16188148.7.

*Primary Examiner* — Frank D Mills
(74) *Attorney, Agent, or Firm* — K&L Gates LLP

(57) ABSTRACT

A monitoring apparatus in an electric power system includes a communication unit for performing communication with a data server included in the electric power system to receive real-time data, a user input unit for receiving user input for creating a monitoring screen with the real-time data by using a tabular function, and a display unit for displaying the monitoring screen. The apparatus further includes a control unit for creating the monitoring screen in response to the user input to display it in the display unit, to decide at least one or more tasks taking time more than a given time in processing them among a plurality of tasks for performing the tabular function, and to process the at least one or more task and the other remaining tasks than the at least one or more task among the plurality of tasks simultaneously in parallel.

6 Claims, 13 Drawing Sheets

(51) Int. Cl.
- *G06F 16/2455* (2019.01)
- *G06F 9/46* (2006.01)
- *G06F 11/30* (2006.01)
- *G06Q 10/06* (2012.01)
- *G06Q 50/06* (2012.01)
- G05B 19/048 (2006.01)
- H04L 29/08 (2006.01)

(52) U.S. Cl.
 CPC ...... *G06F 16/248* (2019.01); *G06F 16/24552* (2019.01); *G06Q 10/06* (2013.01); *G06Q 50/06* (2013.01); G05B 19/048 (2013.01); H04L 67/12 (2013.01)

(58) Field of Classification Search
 USPC ........................................................ 715/747
 See application file for complete search history.

(56) References Cited

U.S. PATENT DOCUMENTS

| | | | |
|---|---|---|---|
| 6,883,136 B1 | 4/2005 | Weinberg et al. | |
| 7,143,339 B2 | 11/2006 | Weinberg et al. | |
| 8,429,553 B2 | 4/2013 | Maybee et al. | |
| 2002/0091702 A1* | 7/2002 | Mullins | G06F 16/25 |
| 2004/0107025 A1* | 6/2004 | Ransom | G05B 19/4185 |
| | | | 700/286 |
| 2013/0304991 A1 | 11/2013 | Bottcher et al. | |
| 2014/0288888 A1 | 9/2014 | Yoon et al. | |
| 2015/0161193 A1* | 6/2015 | Damodar | G06F 16/2365 |
| | | | 707/694 |
| 2016/0034158 A1* | 2/2016 | Livesay | G05B 19/41835 |
| | | | 715/736 |

FOREIGN PATENT DOCUMENTS

| | | |
|---|---|---|
| CN | 104182902 A | 12/2014 |
| CN | 104503405 A | 4/2015 |
| CN | 105005938 A | 10/2015 |
| EP | 2945067 A2 | 11/2015 |
| JP | 2015038736 A | 2/2015 |
| KR | 101375994 B1 | 4/2014 |
| KR | 20150089269 A | 8/2015 |
| WO | 2005/081134 A1 | 9/2005 |

\* cited by examiner (PRIOR ART)

(PRIOR ART)

(PRIOR ART)

MONITORING APPARATUS IN ELECTRIC POWER SYSTEM

CROSS REFERENCE TO RELATED APPLICATION

This application claims the benefit of Korean Patent Application No. 10-2016-0006620, filed on Jan. 19, 2016, entitled "MONITORING APPARATUS IN ELECTRIC POWER SYSTEM", which is hereby incorporated by reference in its entirety into this application.

TECHNICAL FIELD

The present disclosure relates to a monitoring apparatus in an electric power system, and, more particularly, to a monitoring apparatus in an electric power system for improving the performance of the tabular display function used for editing monitoring screens.

BACKGROUND

An electric power system is composed of an EMS (Energy Management System), a SCADA (Supervisory Control And Data Acquisition), and a DMS (Distribution Management System). The EMS or the SCADA and the DMS collect and edit data about sub-systems or constituting apparatuses of the electric power system, and display the data on a monitoring screen in order to monitor and control the electric power system.

The EMS or the SCADA and the DMS use the tabular display function to reduce simple repetitive tasks for engineering the monitoring screen. Where the tabular display function is used, one thing needed is to construct one template wanted by a user to display related data in a repetitive form like a table and it is not necessary to engineer data one by one stored in a database. Furthermore, it is easy to display hierarchical data as well as repetitive data when the tabular display function is used. Where the database has not been changed, the data may be used without changing the engineered screen because the contents in the changed database are automatically applied.

FIG. 1 shows components for performing the tabular display function.

The tabular display function may be performed by an RTDB 110, an editor 120 and a viewport 130.

The RTDB (RealTime DataBase) 110 is a real-time database. Real-time data related to operating the electric power system may be stored in the RTDB 110. The real-time data may be the data measured by sub-systems or constituting apparatuses included in the electric power system and stored in the RTDB 110.

The editor 120 may provide the tabular display function so that graphic objects or data values represented depending on changes in the number of data of the database may be applied. The editor 120 is also referred to as a graphic editor.

Specifically, the editor 120 screen may be displayed with an edition screen 121 for editing a monitoring screen, a tool window 122 which is a collection of data edition tools and objects 123 and 124 hierarchically configured. Referring to FIG. 1, there is a hierarchical object composed of a higher layer object 123 and a lower layer object 124. The objects may be displayed with data connected (mapped) thereto.

The real-time data engineered by the editor 120 may be displayed in the viewport 130 in an .ivd file format.

The viewport 130 displays a monitoring screen 131 engineered through the editor 120. In this case, as shown in FIG. 1, the monitoring screen 131 is displayed with two higher layer objects 135 and 137, lower layer objects 136 and 138 for the respective higher layer objects 135 and 137. Meanwhile, although FIG. 1 shows two higher layer objects 135 and 137, higher layer objects may be added correspondingly to the real-time data. In addition, lower layer objects may be added correspondingly to the real-time data.

In this example, the user may engineer the real-time data obtained from the RTDB 110 through the editor 120 to create the monitoring screen 131, and monitor the monitoring screen 131 in the viewport 130 in real time.

FIG. 2 shows an editor screen for performing the tabular display function.

The editor 120 which engineers the monitoring screen may perform the tabular display function. The monitoring screen is composed of graphic objects (for example, circles, lines, squares, rectangles, rhombuses, etc.) and data in a database connected to the graphic objects. An example of engineering the monitoring screen may include changing shapes and sizes of graphic objects depending on data changes in the database and then predetermining visual effects of the monitoring screen.

The user may use editing tools included in the tool window positioned on the right side of the screen of the editor 120 to engineer the graphic object 123 and 124. The editing tools may include tools for engineering graphic object layers, colors, positions and widths on the screen. FIG. 2 shows tools for predetermining colors, heights, widths, tags and attributes. The engineered graphic objects 123 and 124 are displayed on the edition screen of the monitoring screen in response to user's engineering.

Connecting the engineered graphic objects to the points connected (mapped) thereto contributes to extending and displaying database configuration and graphic objects that should be displayed dynamically in the monitoring screen 131 in real time. In this case, the points may mean the concept similar to rows of a general database.

FIG. 3 shows a viewport screen which performs the tabular display function.

The monitoring screen 131 for which the engineering is completed is actually operated in the viewport 130. The viewport 130 displays the monitoring screen 131, and connects it to the database to change graphic objects 135, 136, 137 and 138 in the monitoring screen 131 and show dynamic effects of the monitoring screen 131.

As described about FIG. 2, when graphic objects 123 and 124 hierarchically structured are predetermined through the editor 120, the monitoring screen 131 of the viewport 130 displays the higher layer graphic objects 135 and 137 and the lower layer graphic objects 136 and 138 for the respective higher layer graphic objects.

As described above, the conventional tabular display function is a function for displaying data sets stored in a database in a table form by engineering the data just once. However, the time taken to display tabulars increases in proportion to the amount of data stored in the database, and it is thus impossible to implement proper response speed for users. Moreover, displaying a large volume of data lowers the performance of the tabular display function.

SUMMARY

In view of the above, the present disclosure provides a monitoring apparatus in an electric power system to improve response speed for users by reducing the time taken to display tabulars, and increase tabular display speed although a large volume of data are displayed to improve the performance of the tabular display function.

It should be noted that the technical problems to be solved in the present disclosure are not limited to the technical problems described above, and other technical problems not described above may be understood explicitly by those skilled in the art of the embodiments suggested by the following description.

In accordance with the present disclosure, there is provided a monitoring apparatus in an electric power system. The apparatus includes: a communication unit configured to perform communication with a data server included in the electric power system to receive real-time data; a user input unit configured to receive user input for creating a monitoring screen with the real-time data by using a tabular function; a display unit configured to display the monitoring screen; and a control unit configured to create the monitoring screen and then display it in the display unit in response to the user input, to decide at least one or more tasks taking time more than a given time in processing them among a plurality of tasks for performing the tabular function, and to process the at least one or more task and other remaining tasks than the at least one or more task among the plurality of tasks simultaneously in parallel.

As described above, in accordance with the embodiments of the present disclosure, the whole service response time may be reduced by processing tasks taking long time simultaneously in parallel in performing the tabular display function.

DETAILED DESCRIPTION

Hereinafter, specific embodiments of the present disclosure will be described in detail with reference to the accompanying drawings. However, it should be noted that the technical idea of the present disclosure is not limited by the embodiments described herein below, and other retrogressive embodiments by adding, changing and deleting other components, or other embodiments embraced in the scope of the technical idea of the present disclosure may be readily suggested.

Although the terms used in the present disclosure are selected from the group of general terms widely used in relation to the current concerned technology if possible, it should be noted that some terms are selected by the applicant of the present disclosure in specific cases. In those cases, the meaning of the terms is described in detail in the Detailed Description of the present disclosure. Therefore, it should be noted that it is essential to understand the present disclosure with the meaning of the terms, not just with the word thereof. In the following description, the word 'include' does not exclude existence of other components or operations than those listed.

Figure 1:
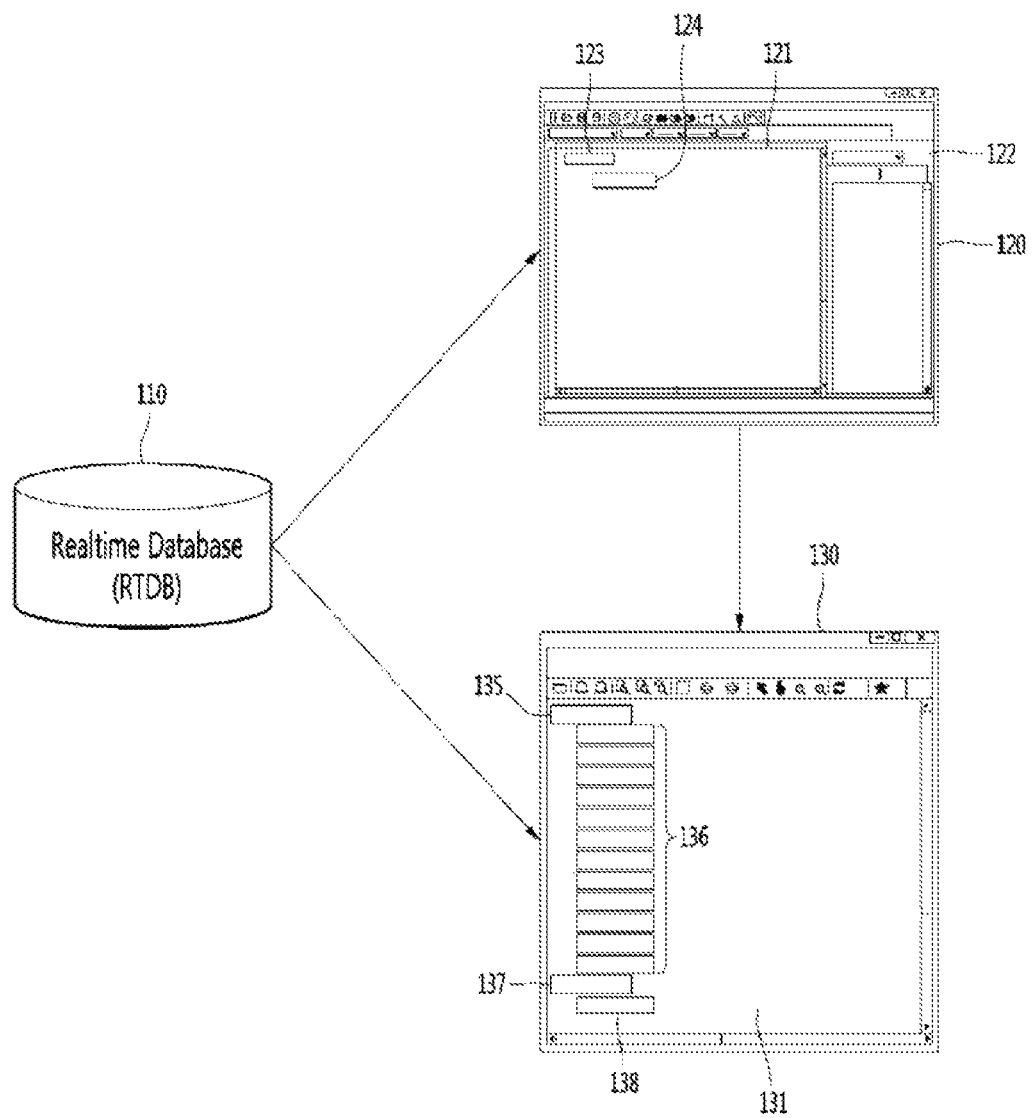
FIG. 1 shows components performing the tabular display function.
Figure 2:
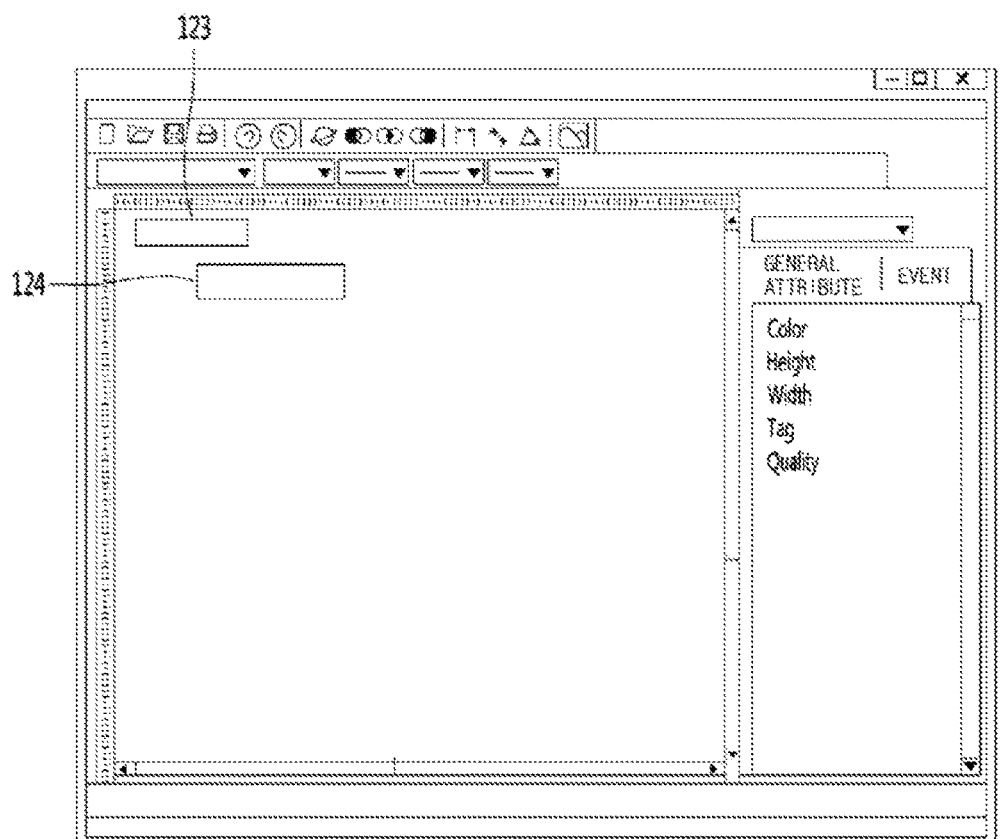
FIG. 2 shows an editor screen performing the tabular display function.
Figure 3:
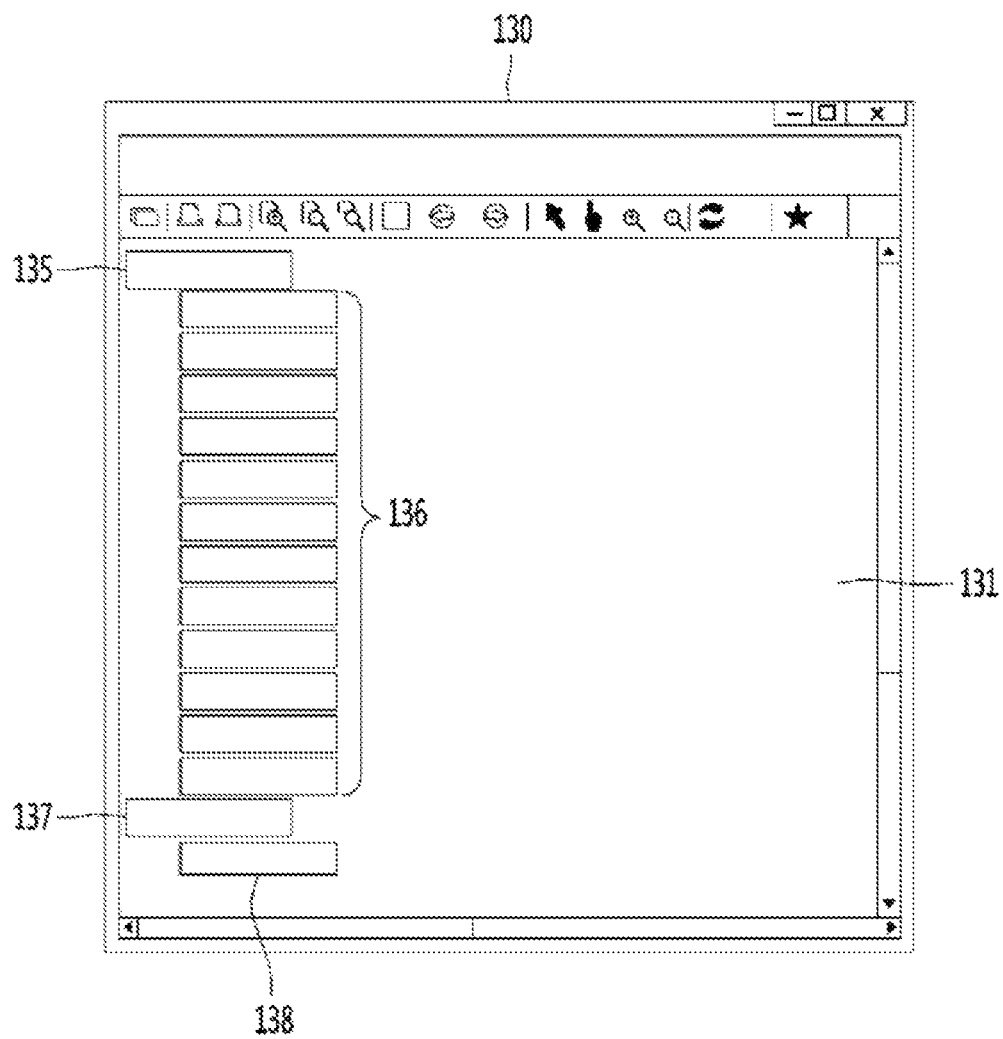
FIG. 3 shows a viewport screen performing the tabular display function.
Figure 4:
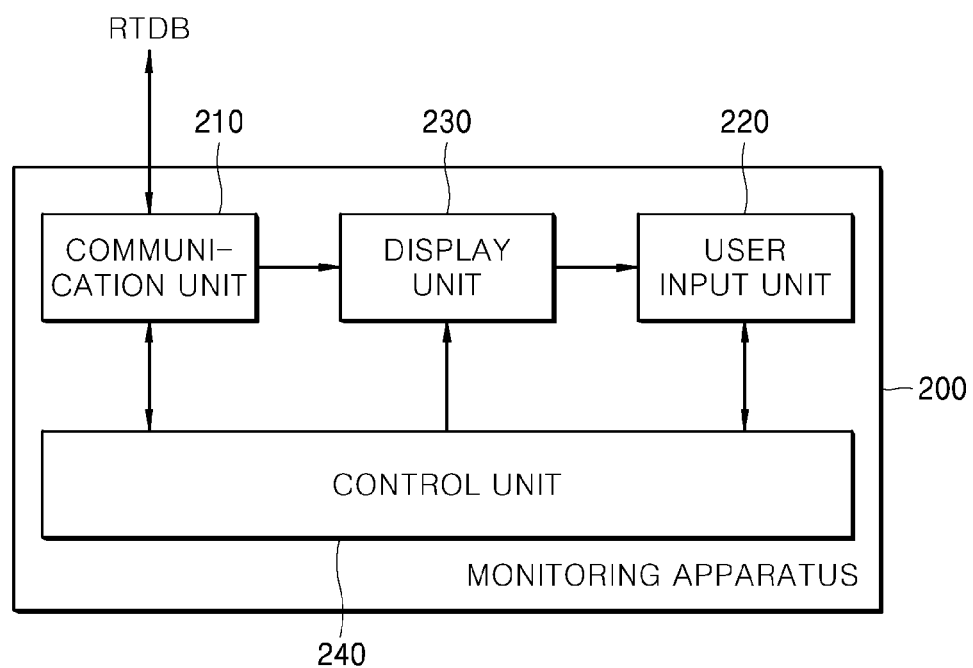
FIG. 4 shows a block diagram showing the configuration of a monitoring apparatus in an electric power system in accordance with an embodiment of the present disclosure.

FIG. 4 shows a block diagram showing the configuration of a monitoring apparatus in an electric power system in accordance with an embodiment of the present disclosure.

The monitoring apparatus 200 in an electric power system in accordance with an embodiment of the present disclosure is included in the electric power system to collect and manage data related to operating the electric power system, and may monitor the condition of the electric power system. The electric power system is described herein below while describing FIG. 13.

The monitoring apparatus 200 in the electric power system in accordance with an embodiment of the present disclosure may include a communication unit 210, a user input unit 220, a display unit 230 and a control unit 240.

The communication unit 210 may communicate with a data server included in the electric power system to receive real-time data.

The data server may be an RTDB (RealTime DataBase) server for storing real-time data related to operating the electric power system.

The communication between the communication unit 210 and the data server may include various types of wire-based or wireless communication, for example, optical fiber communication, power-line communication, local area communication or mobile communication.

The user input unit 220 may receive user input for creating a monitoring screen with the real-time data by using the tabular display function.

The tabular function may be a function for aligning and displaying objects to match the object display forms predetermined by a user.

The objects may be graphic objects, for example, circles, lines, squares, rectangles, or rhombuses, etc. The exemplary objects may be connected (mapped) to real-time data.

In accordance with an embodiment, the objects may be configured in a hierarchical structure including higher layer objects and lower layer objects.

The display unit 230 displays the monitoring screen.

On the monitoring screen, objects and real-time data connected thereto may be aligned and displayed.

The display unit 230 may include a display panel (not shown) and a panel-driving unit (not shown) for driving the display panel. By the way, the display panel may be implemented in the form of an LCD (Liquid Crystal Display), OLED (Organic Light Emitting Diode) or PDP (Plasma Display Panel).

The control unit 240 may create a monitoring screen and display it in the display unit 230 in response to user input.

Upon creating a monitoring screen with real-time data by using the tabular function, the control unit 240 decides at least one or more tasks among a plurality of tasks for performing the tabular function, for which time longer than a given time is taken to process the one or more tasks. It may process the at least one or more tasks among the plurality of tasks and other remaining tasks than the at least one or more tasks simultaneously in parallel.

Specifically, the control unit 240 includes a first processing unit and a second processing unit. It may assign the at least one or more tasks and the other remaining tasks respectively to the first processing unit and the second processing unit to enable the at least one or more tasks and the other remaining tasks to be processed simultaneously in parallel.

In this example, the first processing unit may be a main processing unit responsible for overall processing and control performed by the control unit 240. The second processing unit may be a parallel processing unit responsible for given processing and control specified by the control unit 240. In accordance with an embodiment, the control unit 240 may assign at least one or tasks which take time longer than a given time in processing them to the parallel processing unit, and the other remaining tasks to the main processing unit.

Meanwhile, the first processing unit and the second processing unit may correspond to a thread performed in one process. A thread is a processing unit created to process one process. Where the first processing unit and the second processing unit process their respective tasks simultaneously in parallel, the process for the tabular display function may be performed by multiple threads. In this regard, the processing time by the tabular display function is reduced.

A plurality of tasks for performing the tabular display function may include a task for verifying an existing database map, a task for copying objects, a task for predetermining copied object coordinates, and a task for creating a database map.

The task for verifying an existing database map is a task for identifying whether the existing database map storing real-time data has been changed.

The task for copying objects is a task for extending the number of the objects and displaying them to match the object display form to correspond to the real-time data.

The task for predetermining copied object coordinates is a task for specifying positions of the copied objects displayed on a screen. The task for creating database maps is a task for creating objects and a database for data connected thereto.

In accordance with an embodiment, the control unit 240 may process at least one of the task for verifying an existing database map and the task for copying objects by means of the parallel processing unit simultaneously in parallel.

The tasks taking the most time among the plurality of tasks described above are the task for verifying an existing database map and the task for copying objects. Accordingly, it is possible to reduce performance time for the plurality of tasks by processing tasks taking the most time simultaneously in parallel by means of the parallel processing unit. Processing speed increases where both the main processing unit and the parallel processing unit process tasks simultaneously.

Specifically, the control unit 240 may perform the task for verifying an existing database map by means of the parallel processing unit, and perform other remaining tasks by means of the main processing unit. This process is described herein below while describing FIG. 11.

Otherwise, the control unit 240 may perform the task for copying objects by means of the parallel processing unit, and perform other remaining tasks by means of the main processing unit. This process is described herein below while describing FIG. 12.

Moreover, the control unit 240 may perform both the task for verifying an existing database map and the task for copying objects by means of the parallel processing unit, and other remaining tasks by means of the main processing unit.

Meanwhile, the control unit 240 reuses the existing database map where the existing database map has not been changed as a result of performing the task for verifying an existing database map. Otherwise, where the existing database map has been changed, it may create a new database map.

In this example, the control unit 240 may store the existing database map or the new database map in a storage unit (not shown) described below.

Meanwhile, the monitoring apparatus 200 in an electric power system in accordance with an embodiment of the present disclosure may further include a storage unit (not shown).

The storage unit (not shown) stores a database. The database may include real-time data, database maps and the like.

To this end, the storage unit (not shown) may be implemented as at least one type of a storage medium selected from the group of a RAM (Random Access Memory), SRAM (Static Random Access Memory), ROM (Read-Only Memory), EEPROM (Electrically Erasable Programmable Read-Only Memory), PROM (Programmable Read-Only Memory) and magnetic memory.

Figure 5:
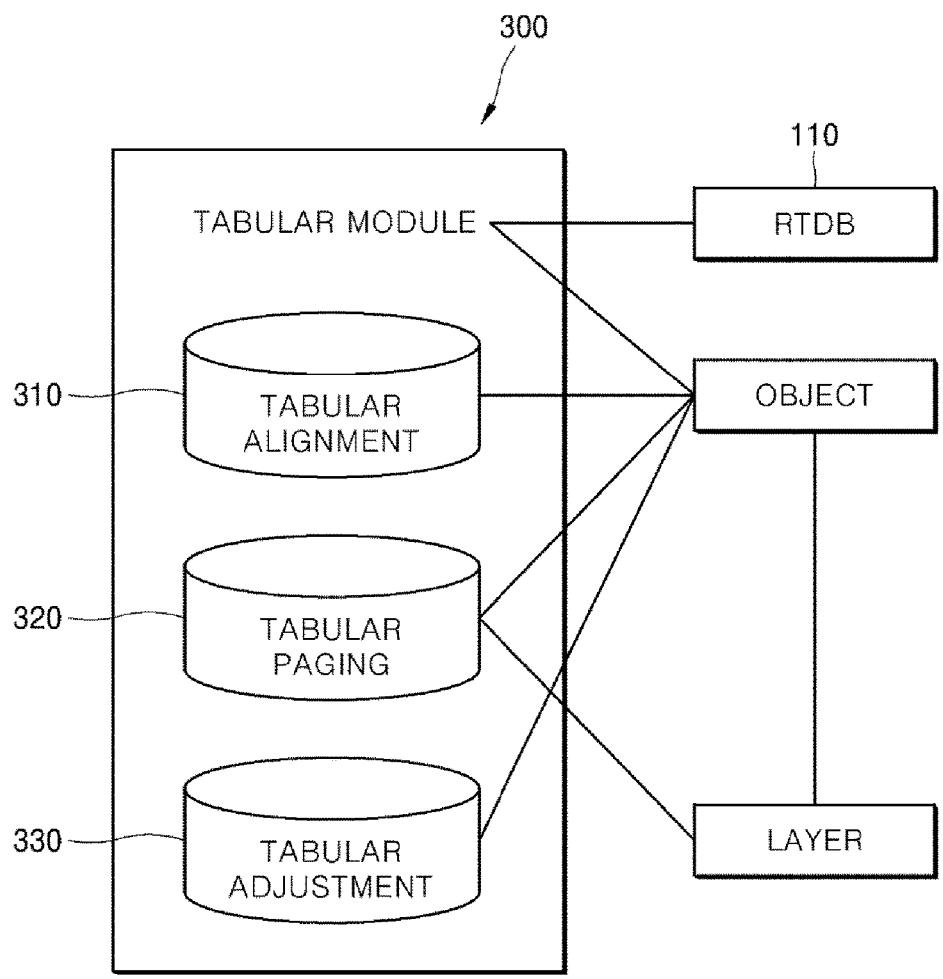
FIG. 5 shows a block diagram showing the configuration of a tabular module performing the tabular display function in accordance with an embodiment of the present disclosure.

FIG. 5 shows a block diagram showing the configuration of a tabular module performing the tabular display function in accordance with an embodiment of the present disclosure.

To perform the tabular display function, a tabular module 300 may be included in the control unit 240 of the monitoring apparatus 200 shown in FIG. 4.

The tabular module 300 may perform the tabular display function for aligning and displaying objects to match the object display form predetermined by a user. Furthermore, the tabular module 300 may provide overall tabular functions, and functions for user's convenience, for example, alignment and paging included in the tabular display function while operating the monitoring screen. To this end, the tabular module 300 may include calculation blocks, for example, a tabular alignment block 310, a tabular paging block 320 and a tabular adjustment block 330.

Meanwhile, the word tabular may be a concept including objects and data connected thereto and displayed.

The tabular alignment block 310 is responsible for tabular alignment. Specifically, the tabular alignment block 310 may perform the alignment in ascending order or descending order of the tabulars. Where the tabulars are configured hierarchically, the tabular alignment block 310 may align the tabulars hierarchically to correspond to higher layers and lower layers.

The tabular paging block 320 is responsible for tabular paging. Specifically, the tabular paging block 320 may create layers for paging and move objects, or add page index objects.

The tabular adjustment block 330 reconfigures coordinates of extended graphic objects on the screen in order to display the tabulars on the screen.

In FIG. 5, the tabular module 300 receives real-time data from the RTDB 110 through communication with the RTDB 110. Received real-time data may be connected to objects and displayed. The tabular alignment block 310 aligns the objects, the tabular paging block 320 and the tabular adjustment block 330 display the objects on the screen as graphic objects. In this example, the tabular paging block 320 may configure the graphic objects as a layer hierarchically structured by grouping the graphic objects.

Figure 6:
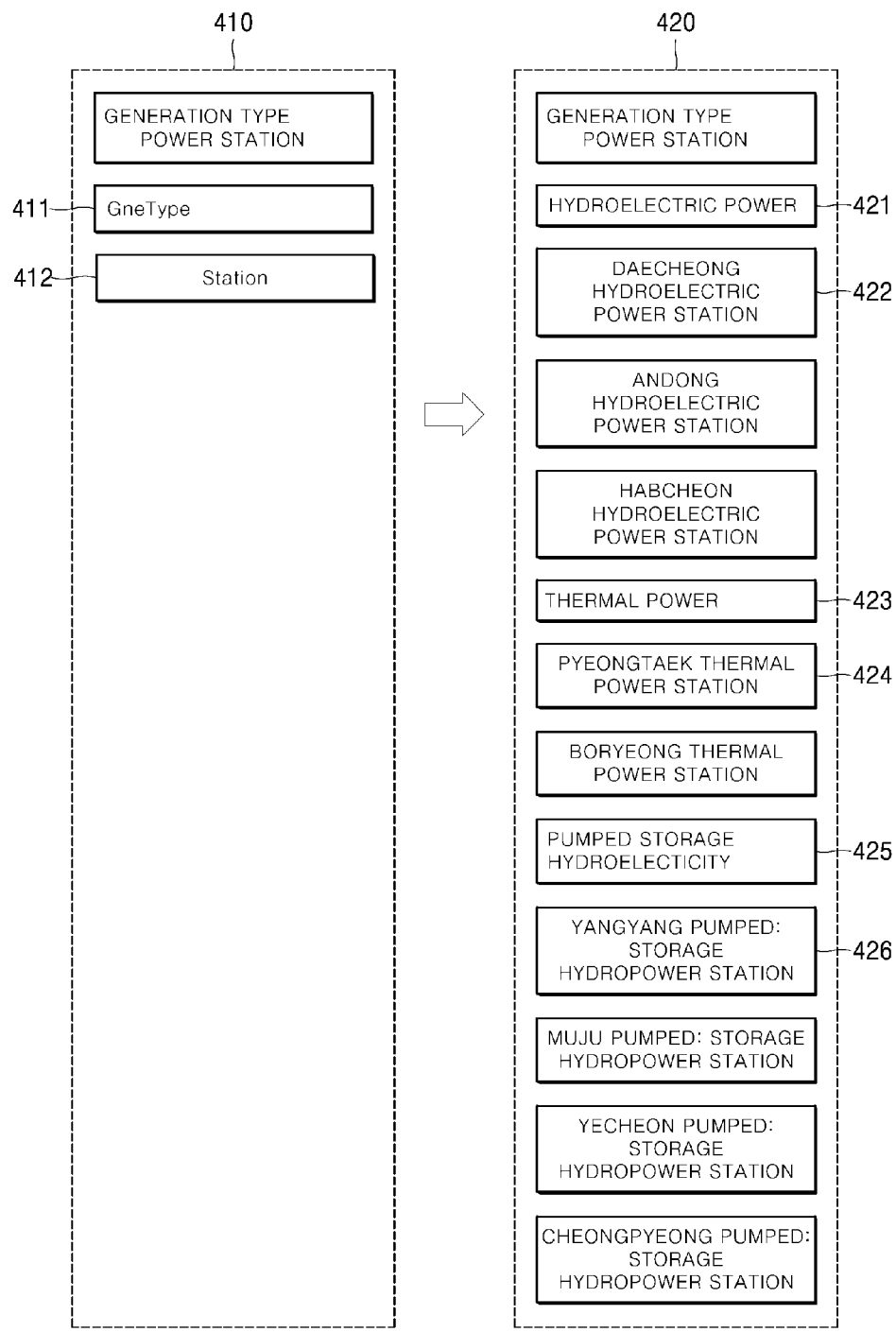
FIG. 6 shows objects and data connected thereto engineered by means of the tabular display function.

FIG. 6 shows objects and data connected thereto engineered by means of the tabular display function.

The FIG. 410 on the left side shows an edition screen displayed when a user engineers the monitoring screen in the editor.

On the edition screen 410, an object hierarchically structured and composed of a higher layer object 411 and a lower layer object 412 is displayed.

Specifically, the higher layer object 411 GenType standing for Generation Type is about generation type data. The higher layer object 411 configures layer 0 in the hierarchical structure, and includes information about generation type. For example, it may include information, for example, hydropower, thermal power, pumped-storage hydropower and nuclear power.

The lower layer object 412 is about power station data. The lower layer object 412 configures layer 1 in the hierarchical structure, and includes information about locations of power stations. For example, for the generation type of hydropower 421, the lower layer object corresponding thereto may include Daecheong Hydropower Station 422, Andong Hydropower Station, and Habcheon Hydropower Station. For the generation type of thermal power 423, the lower layer object corresponding thereto may include information about Pyeongtaek Thermal Power Station 424, Boryeong Thermal Power Station and the like. For the generation type of pumped-storage hydropower 425, the lower layer object corresponding thereto may include information about Yangyang Pumped-storage Hydropower Station 426, Muju Pumped-storage Hydropower Station, Yecheon Pumped-storage Hydropower Station and Cheongpyeong Pumped-storage Hydropower Station.

Reference numeral 420 on the right side shows a screen of a tabular extended in the viewport and displayed.

Three higher layer objects 421, 423 and 425 corresponding to the higher layer object 411 engineered in the editor are extended. In FIG. 6, the hydropower 421 is a hydropower object in the generation type data; the thermal power 423 is a thermal power object in the generation type data; and the pumped-storage hydropower 425 is a pumped-storage object in the generation type data. That is, the hydropower object 421, the thermal power object 423 and the pumped-storage hydropower object 425 are extended correspondingly to the generation type.

Furthermore, the lower layer object 412 is extended correspondingly to the higher layer object 411. In FIG. 6, the Daecheong Hydropower Station 422 is a Daecheong hydropower object under the lower layer of the hydropower object 421. The Pyeongtaek Thermal Power Station 424 is a Pyeongtaek thermal power object under the lower layer of the thermal power object 423. The Yangyang Pumped-storage Hydropower Station 426 is a Yangyang pumped-storage object under the lower layer of the pumped-storage hydropower object 425.

Figure 7:
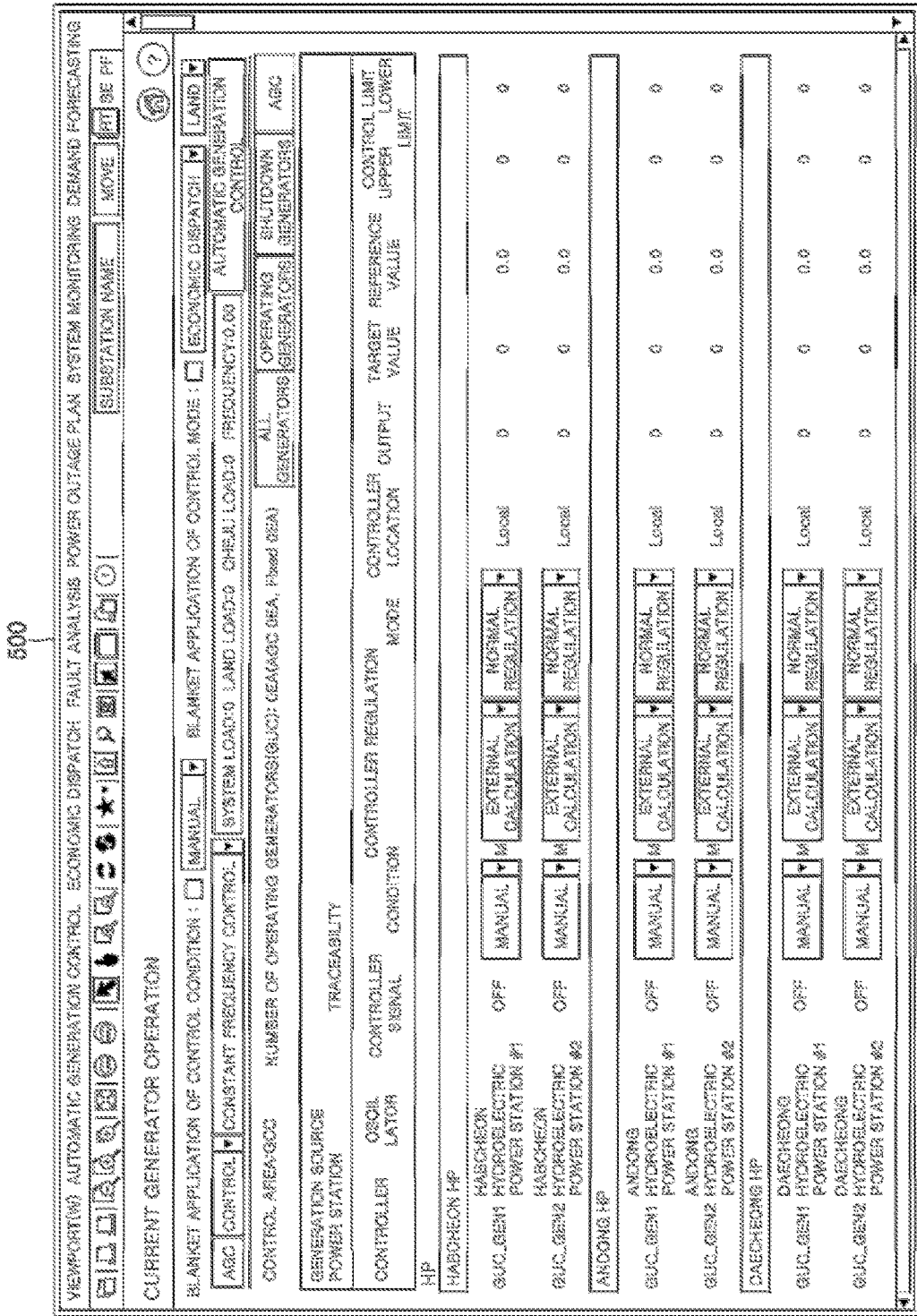
FIG. 7 illustrates an embodiment of a monitoring screen displayed through engineering illustrated in FIG. 6.

FIG. 7 illustrates an embodiment of a monitoring screen displayed by means of engineering described while describing FIG. 6.

Connecting an object to a connected (mapped) point thereto engineered by means of the tabular display function contributes to extending and showing database configuration and graphic objects that should be dynamically displayed on the real-time monitoring screen. For this example, FIG. 7 shows an embodiment of an actual screen.

Specifically, engineering objects hierarchically structured and composed of higher layers corresponding to generation type and lower layers corresponding to power stations as shown in FIG. 6 results in displaying a monitoring screen 500 shown in FIG. 7. Referring to FIG. 7, generation types and power stations corresponding thereto are aligned and displayed hierarchically on the monitoring screen 500. Furthermore, data related to respective power stations are displayed on the monitoring screen 500.

Figure 8:
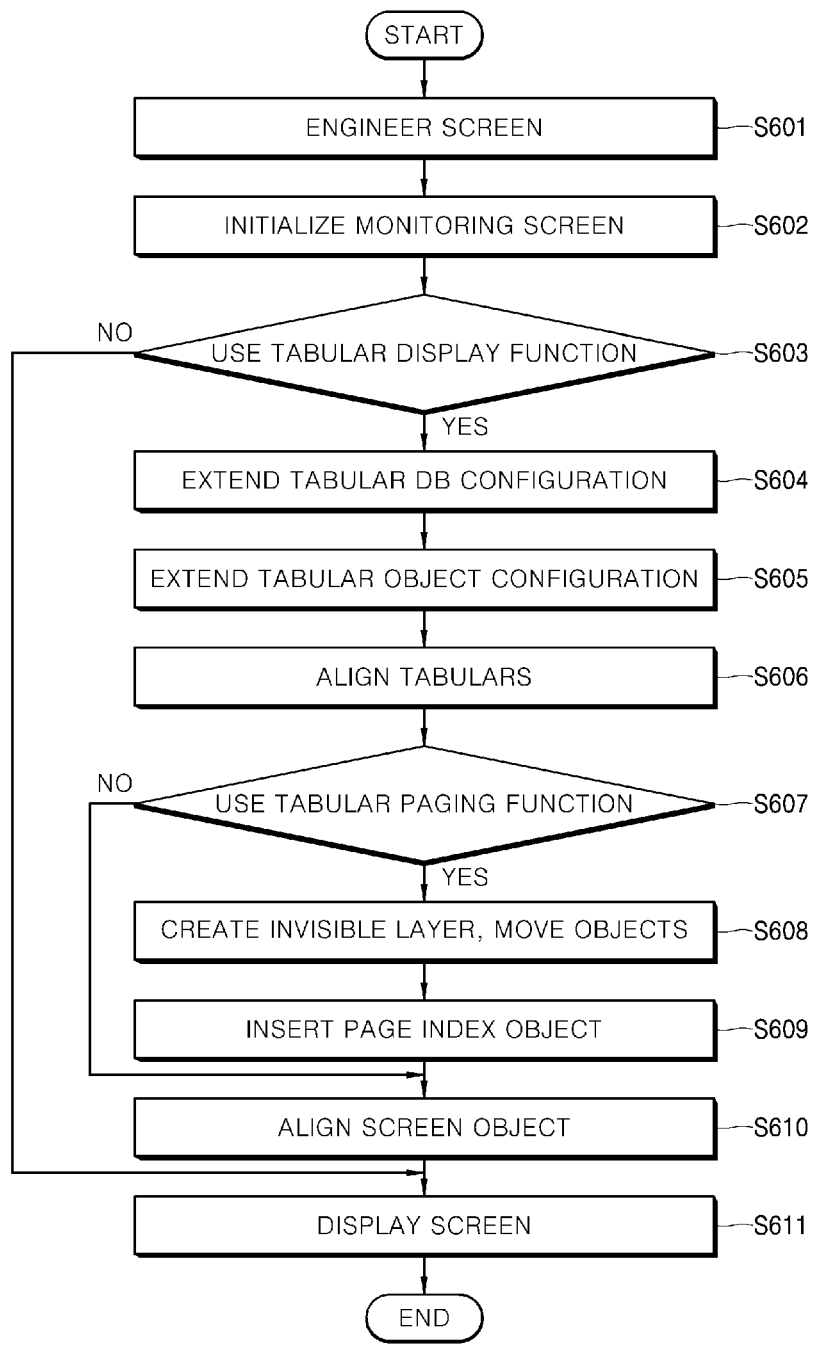
FIG. 8 illustrates a general process of performing the tabular display function.

FIG. 8 illustrates a general process of performing the tabular display function.

Engineering a screen is executed in the monitoring apparatus 200 at operation S601. Specifically, the operation engineering a screen may be performed by means of the editor. The editor is executed when a user enters a command for engineering a screen in the monitoring apparatus 200.

The monitoring apparatus 200 initializes the monitoring screen at operation S602.

Since the monitoring screen reflects and displays real-time data, the data may be changed or updated in real time. To this end, where the editor is executed, the monitoring screen may be initialized for updating data changes.

The monitoring apparatus 200 decides whether the tabular display function is used or not at operation 603.

Specifically, the monitoring apparatus 200 may decide whether the tabular display function is predetermined to be used in engineering data.

Where it is predetermined to use the tabular display function in engineering data (YES at operation S603), the monitoring apparatus 200 performs the extension function for tabular display. Specifically, it extends the configuration of the tabular database DB at operation S604 and then extends the configuration of the tabular object at operation S605. Herein, the word extend may mean that a general database table is predetermined through engineering, and the database and graphic objects are extended and displayed as many as the number of rows in an actual concerned table.

When the configuration of the tabular database is extended at operation S604, the database configuration of the RTDB 110 actually to be extended in the process of engineering is extended.

When the configuration of the tabular object is extended at operation S605, the configuration of the graphic object is extended.

Otherwise, where it is not predetermined to use the tabular display function in engineering data (NO at operation S603), the tabular display function is not performed, and the monitoring screen is immediately displayed at operation S611.

When extension for tabular display is completed, the tabulars are aligned at operation S606.

Specifically, alignment in ascending order or descending order of graphic objects may be performed on the basis of the data connected to the graphic objects.

When the tabulars are aligned, the monitoring apparatus 200 decides whether the tabular paging function is used or not at operation S607.

Where it is decided that the tabular paging function is used (YES at operation S607), the monitoring apparatus 200 creates an invisible layer for paging and moves objects at operation S608, adds and inserts a page index object at operation S609.

Subsequently, the monitoring apparatus 200 adjusts screen objects at operation S610. Adjusting screen objects may be a process of reconfiguring coordinates of extended graphic objects on the screen to display the tabulars on the screen. Therefore, the monitoring apparatus 200 reconfigures the coordinates of the contents extended with the tabulars on the screen.

When adjusting screen objects is completed, the monitoring apparatus 200 displays the screen at operation S611.

On the other hand, where the tabular paging function is decided not used (NO at operation S607), the monitoring apparatus 200 goes to operation S610 without going through the operations S608 and S609 for performing the paging function. The monitoring apparatus 200 then adjusts screen objects at operation S610, and displays the monitoring screen at operation S611. After the operation S611, the procedure ends.

Figure 9:
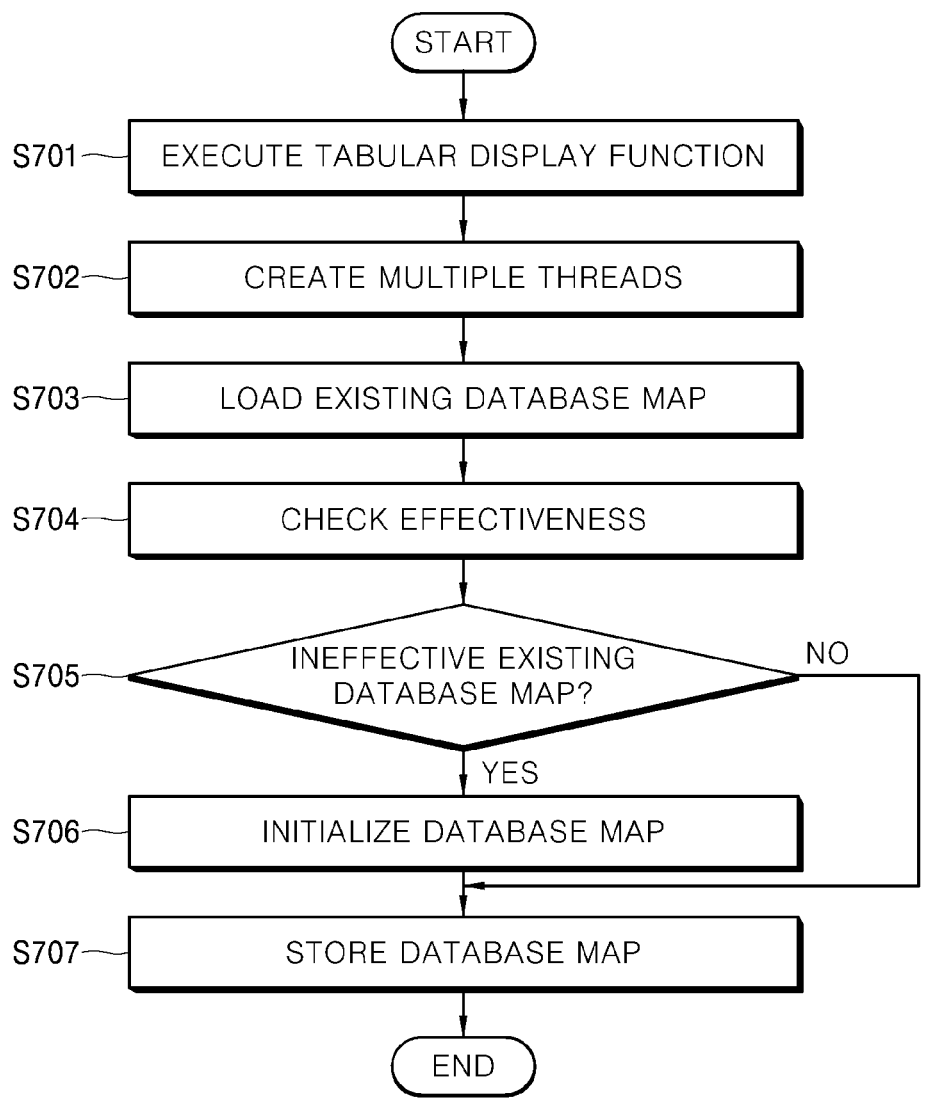
FIG. 9 illustrates a process of performing the tabular display function in accordance with an embodiment of the present disclosure.

FIG. 9 illustrates a general process of performing the tabular display function in accordance with an embodiment of the present disclosure.

By using the tabular display function in accordance with an embodiment of the present disclosure, it is possible to reduce time taken to display a whole screen by processing tasks taking long time in parallel, and further applying a caching technique to store data. This process contributes to reducing the time taken to perform the tabular display function.

Specifically, it is possible to process the task for verifying an existing database map which is one of the tasks for performing the tabular display function, simultaneously in parallel, and to store the database map in a caching technique.

The time for processing tabular display is reduced by processing the task for verifying an existing database map by means of the parallel processing unit simultaneously in parallel with the task of the main processing unit.

Storing database maps in a caching technique reduces the count of communications with the RTDB and the time for communication, and increases the tabular display processing speed in turn. That is, it is to import a database map created before at an early stage of creating the tabulars and check effectiveness with the current database. In this example, where effectiveness check fails, the database map is initialized and the database map created in extending tabular object configuration is stored. On the other hand, where the effectiveness check is successful, communication with the database is not needed because it is just necessary to use an existing database map without creating a database map in relation to the task for creating database maps.

The tabular display function is performed at operation S701.

When the tabular display function is performed, the tabular module 300 creates multiple threads at operation S702.

When creating the multiple threads, a plurality of tasks created from one process may be processed by means of the multiple threads simultaneously in parallel.

The tabular module 300 loads the existing database map at operation S703.

When the existing database map is imported, the tabular module 300 checks effectiveness of the existing database map at operation S704.

The effectiveness check is a procedure to identify whether a stored database map may be reused or not. Specifically, the tabular module 300 identifies whether the contents of the database have been changed or not when the existing screen is open or the current screen is open. Where it has been changed, the tabular module 300 creates a new database map as it does when the screen is first open. Otherwise, that is, where no change of contents is found, the tabular module 300 reuses the database map. In this example, communication with the database to get real-time data is not required. Therefore, the time for performing the whole tabular display function is reduced.

Where effectiveness check is completed, the tabular module 300 decides whether the existing database map is effective or not at operation S705.

Where the existing database map is ineffective (YES at operation S705), the tabular module 300 initializes the database map at operation S706.

Otherwise, that is, where the existing database map is effective (NO at operation S705), the tabular module 300 does not initialize the database map, but uses the existing database map without change.

After completing effectiveness check and subsequent processing, the tabular module 300 stores the database map at operation S707.

Specifically, the tabular module 300 may store the initialized database map or the existing database map in a caching technique. The caching technique is a technique for storing data frequently used temporarily in a device or system. When a database map is stored in a caching technique, the tabular module 300 may reduce the count of communications with the RTDB 110 and the time for communication to look up the real-time data.

When the database map is stored, the procedure ends.

As more data are displayed in the tabulars, more time is taken to display the data. Therefore, this embodiment reduces the count of communications with the RTDB by processing tasks taking a considerable amount of time in parallel, and storing database maps in a caching technique. This may contribute to improving the performance of the tabular display function.

Figure 10:
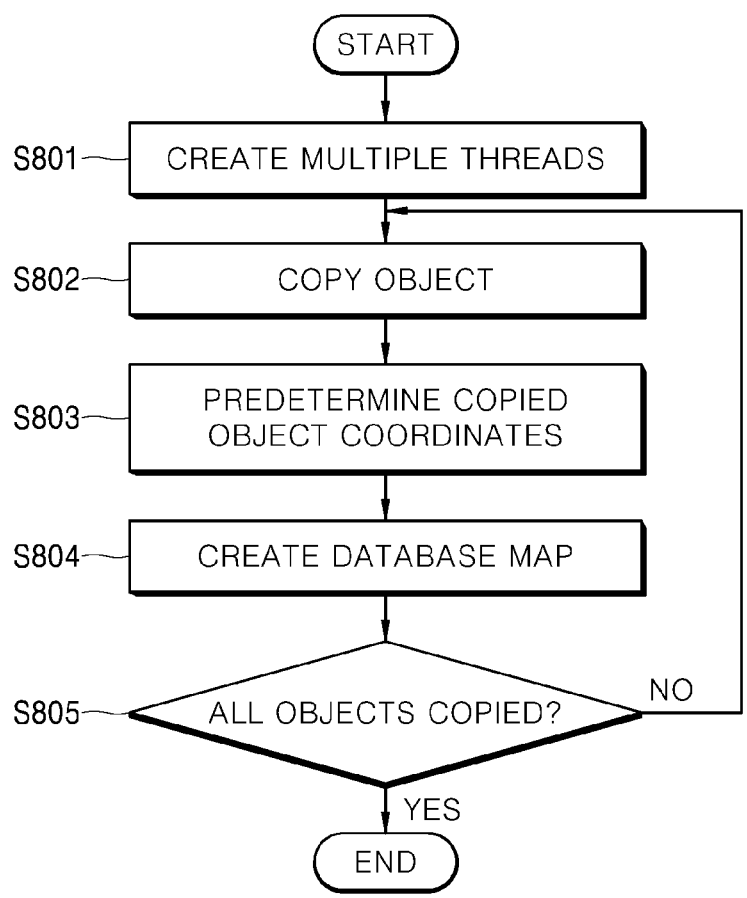
FIG. 10 illustrates a process of extending tabular object configuration in accordance with an embodiment of the present disclosure.

FIG. 10 illustrates a process of extending tabular object configuration in accordance with an embodiment of the present disclosure. The operation S605 of extending tabular object configuration mentioned while describing FIG. 8 is configured to include the task for copying objects, the task for predetermining copied object coordinates and the task for creating database maps, and the tasks repeat unit all tabular objects are extended.

In this example, the tasks taking the most time are the task for copying objects and the task for creating database maps. The task for copying objects consumes the processing time by the CPU of the control unit 240 the most, and the task for creating database maps consumes the communication time with the RTDB 110 the most.

Therefore, in this embodiment, it is possible to process the task for copying objects simultaneously in parallel, and create a database map based on the database map stored in a caching technique.

Where the tabular module 300 performs the task for extending tabular object configuration, it creates multiple threads for processing tasks in parallel at operation S801.

The tabular module 300 copies objects at operation S802.

The tabular module 300 predetermines the coordinates of copied objects at operation S803.

The tabular module 300 refers to the coordinates of copied objects to create a database map at operation S804.

Thereafter, the tabular module 300 decides whether all objects are copied or not at operation S805.

If it is decided that all objects are copied (YES at operation S805), the task for extending object configuration ends. Otherwise, where it is decided that all objects are not copied (NO at operation S805), the tabular module 300 returns to operation S802 to repeat the operations from operations S802 to S804 until all objects are copied.

In accordance with this embodiment described above, the task for copying objects is processed simultaneously in parallel, which takes the most time among the tasks for extending tabular object configuration. Since the existing task for copying objects uses a considerable amount of CPU occupancy time, the time taken for copying objects may be reduced by separating and processing the task in parallel.

In addition, using a database map stored in a caching technique when creating a database map contributes to reducing the count of communications with the RTDB to result in reducing the whole time taken in extending tabular object configuration. This improves user response time.

Figure 11:
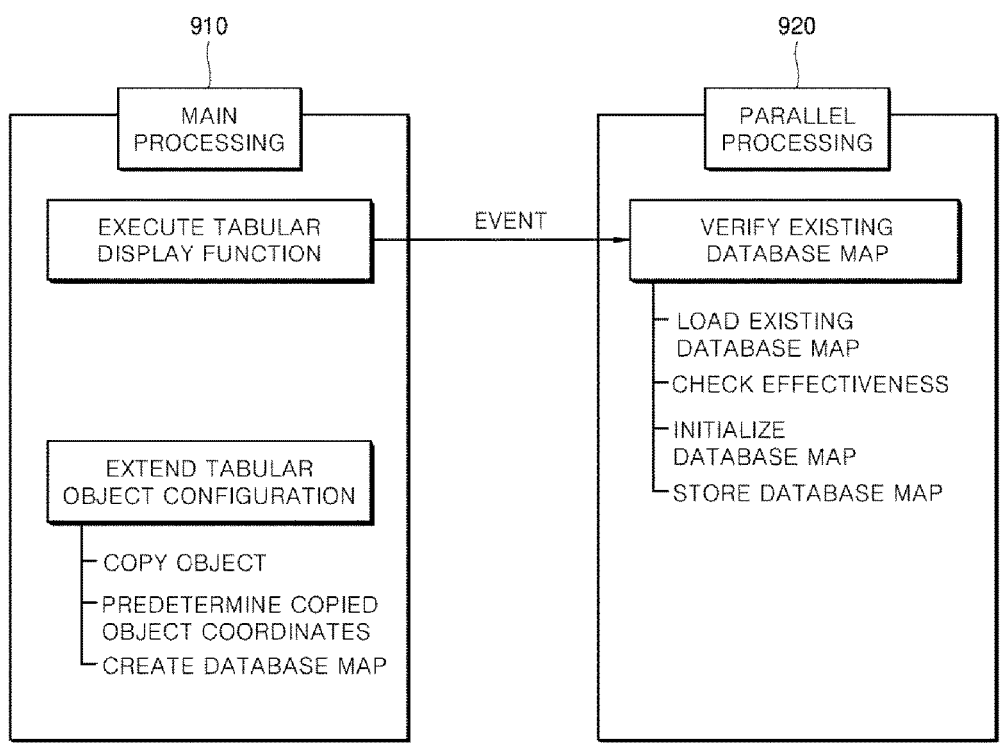
FIG. 11 illustrates a method for processing the tabular display function in parallel in accordance with an embodiment of the present disclosure.

FIG. 11 illustrates a method for processing the tabular display function in parallel in accordance with an embodiment of the present disclosure.

In accordance with an embodiment of the present disclosure, it is possible to process the task for verifying an existing database map in parallel among the plurality of tasks for the tabular display function. Specifically, the main processing 910 may process tasks related to the tabular display function including extension of tabular object configuration, and the parallel processing 920 may perform the task for verifying an existing database map which takes a considerable amount of time for the performance In this example, performing the task for verifying an existing database map may include the task for loading the existing database map, the task for checking effectiveness, the task for initializing the database map, and the task for storing the database map.

Referring to FIG. 11, where the main processing 910 executes the tabular display function, the main processing 910 sends an event signal to the parallel processing 920. The event may be a signal to instruct to perform a concerned task. The task that should be performed in the parallel processing 920 may include the part that should be synchronized with the task processed in the main processing 910. Therefore, the parallel processing 920 performs the task after receiving an event signal.

When receiving the event signal, the parallel processing 920 may process the task for loading an existing database map, the task for checking effectiveness, the task for initializing the database map, and the task for storing the database map in sequence or some of the aforementioned tasks.

Figure 12:
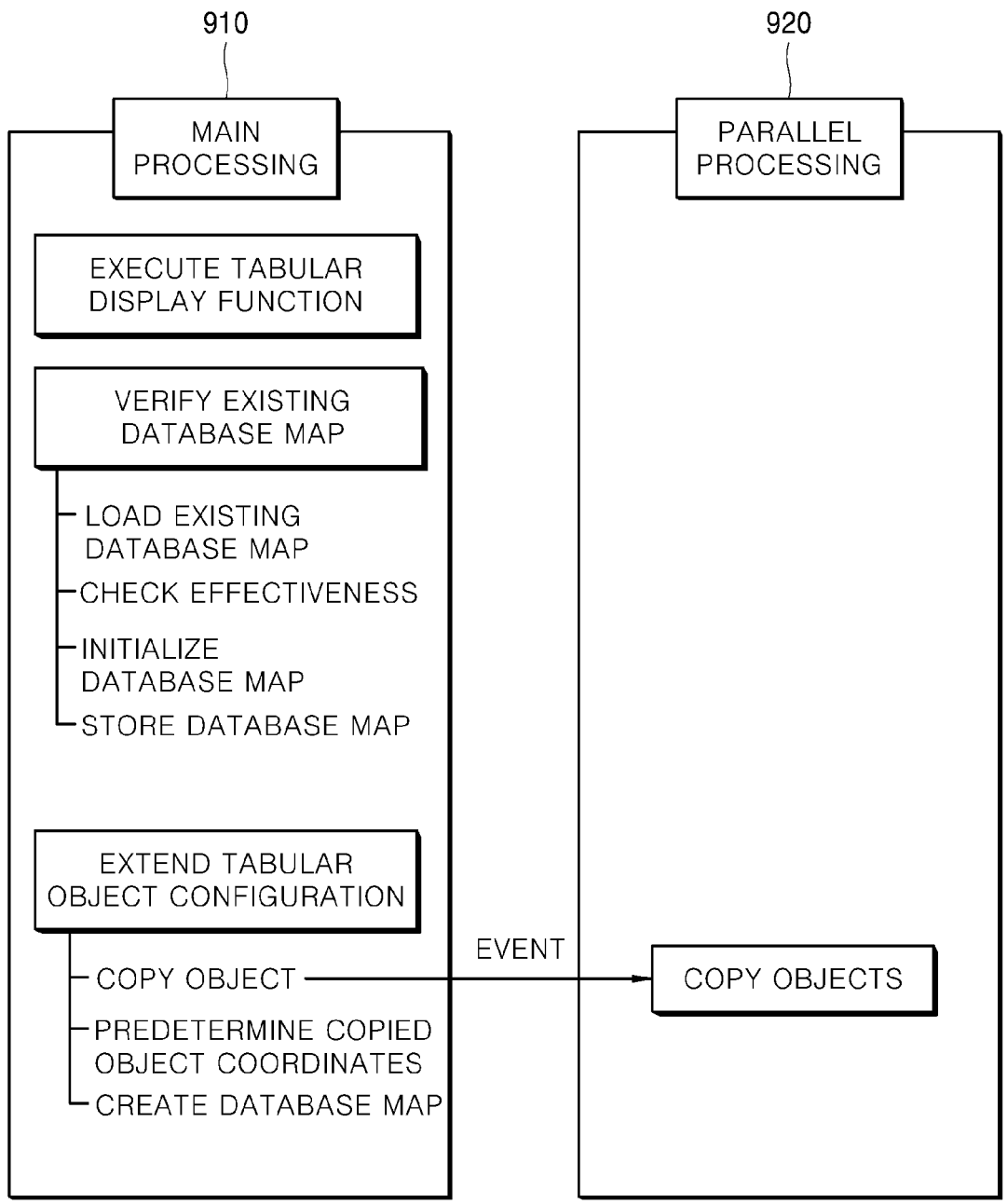
FIG. 12 illustrates a method for processing the tabular display function in parallel in accordance with an embodiment of the present disclosure.

FIG. 12 illustrates a method for processing the tabular display function in parallel in accordance with an embodiment of the present disclosure.

In accordance with an embodiment of the present disclosure, the task for copying objects which is one of the plurality of tasks for the tabular display function may be processed in parallel. Specifically, the main processing 910 processes overall tasks related to the tabular display function including the tasks for verifying an existing database map and extending tabular object configuration. Meanwhile, the parallel processing 920 may perform the task for copying objects which takes a considerable amount of time.

Referring to FIG. 12, the main processing 910 sends an event signal to the parallel processing 920 to process the task for copying objects in order to extend tabular object configuration.

When receiving the event signal, the parallel processing 920 processes the task for copying objects simultaneously in parallel. In this example, all objects to be copied are copied in parallel, and the remaining required part is processed in the main processing 910 whenever the objects are copied.

While the main processing 910 executes the task for predetermining copied object coordinates and the task for creating database maps, the parallel processing 920 copies the next object. This may improve overall response time.

Figure 13:
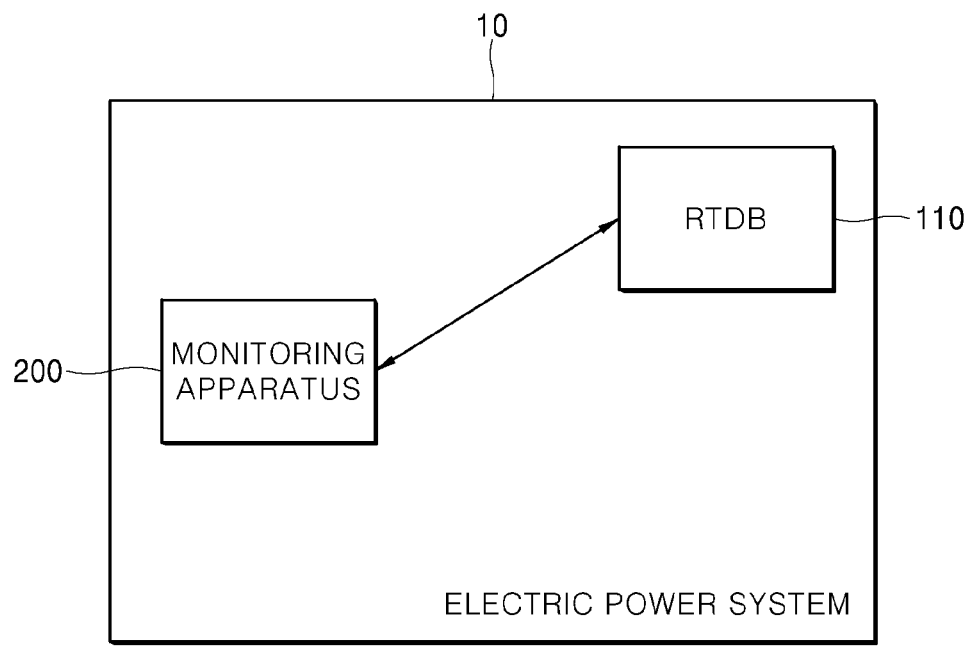
FIG. 13 shows the configuration of an electric power system including a monitoring apparatus in accordance with an embodiment of the present disclosure.

FIG. 13 shows the configuration of an electric power system including a monitoring apparatus in accordance with an embodiment of the present disclosure.

The electric power system 10 may include the monitoring apparatus 200 and the RTDB 110.

The RTDB (RealTime DataBase) 110 is a real-time database. The RTDB 110 may collect and store data related to the electric power system 10 and sub-systems or constituting apparatuses included the electric power system 10 in real time. In accordance with this embodiment, the RTDB 110 may be implemented as a database server for storing databases and performing other additional functions, or a database which just performs the function of storing databases. The RTDB 110 may be used as a means of decision-making required for analyzing an electric power system or operating the electric power system 10.

The monitoring apparatus 200 collects data for controlling an electric power channel and monitors the performance of the electric power channel and the electric power system. To this end, the monitoring apparatus 200 must manage numerous data, and may manage the data by using the tabular display function.

In managing the data, the monitoring apparatus 200 may improve response time for users by applying the tabular display function in accordance with an embodiment of the present disclosure to reduce the time taken for displaying the tabulars. For this purpose, the monitoring apparatus 200 may include the communication unit 210, the user input unit 220, the display unit 230 and the control unit 240. In this regard, the communication unit 210 receives real-time data through communication with a data server included in the electric power system 10. The user input unit 220 uses the tabular function to receive user input for creating a monitoring screen with the real-time data. The display unit 230 displays the monitoring screen. The control unit 240 creates the monitoring screen in response to the user input and then displays it in the display unit.

Furthermore, the control unit 240 decides at least one or more tasks which take time more than a given time in processing the plurality of tasks for performing the tabular function. It processes the at least one or more tasks among the plurality of tasks and the other remaining tasks than the at least one or more tasks simultaneously in parallel.

By the way, the monitoring apparatus 200 in the electric power system 10 may be controlled in the following method.

The monitoring apparatus 200 receives real-time data from a data server included in the electric power system 10. In this example, the monitoring apparatus 200 receives user input for creating a monitoring screen with the real-time data by using the tabular function.

The monitoring apparatus 200 decides at least one or more tasks which take time longer than a given time in processing the plurality of tasks for performing the tabular function. The plurality of tasks may include the task for verifying an existing database map, the task for copying objects, the task for predetermining copied object coordinates and the task for creating database maps. The at least one or more tasks may include at least one of the task for verifying an existing database map and the task for copying objects.

In this example, the monitoring apparatus 200 processes at least one or more tasks among the plurality of tasks and other remaining tasks than the at least one or more tasks simultaneously in parallel.

The monitoring apparatus 200 creates and displays the monitoring screen in response to the user input.

As described above, in accordance with the embodiments of the present disclosure, the whole service response time may be reduced by processing tasks which take a considerable amount of time simultaneously in parallel when performing the tabular display function.

Although the present disclosure is described above, focusing on the embodiments, it should be noted that this is just an example, and does not limit the present disclosure, and those skilled in the art of the present disclosure will understand various modifications and applications not illustrated above may be made without departing the scope of characteristics of the embodiments of the present disclosure. For example, respective components specifically represented in the embodiments may be modified and suggested. It should be construed that the difference related to such modifications and applications is embraced in the scope of the present disclosure specified by the following claims.

What is claimed is:

1. A monitoring apparatus in an electric power system, the apparatus comprising:
    a communication unit configured to perform communication with a data server included in the electric power system to receive real-time data;
    a user input unit configured to receive a user input for creating a monitoring screen with the real-time data by using a tabular function which is a function for aligning and displaying objects to match an object display form predetermined by a user;
    a display unit configured to display the monitoring screen; and
    a control unit, wherein the control unit being configured to:
        create the monitoring screen in response to the user input to display it in the display unit;
        decide a first task which is at least one or more tasks taking time more than a given time in processing them among a plurality of tasks for performing the tabular function; and
        process the first task and a second task which is at least one or more tasks among the other remaining tasks other than the first task among the plurality of tasks simultaneously in parallel,
    wherein the plurality of tasks comprise a task for verifying an existing database map and a task for extending tabular object configuration which comprises a task for copying object, a task for predetermining copied object coordinates, and a task for creating database map,
    wherein the control unit decides the task for copying object as the first task,
    wherein the control unit:
        processes the task for predetermining copied object coordinates and the task for creating database map whenever the objects are copied, and
        processes the task for copying object for copying a next object while processing the task for predetermining copied object coordinates and the task for creating database map.

2. The apparatus of claim 1, wherein the control unit comprises a first processing unit and a second processing unit, and the control unit is configured to assign the first task and the second task respectively to the first processing unit and the second processing unit to process the first task and the second task simultaneously in parallel.

3. The apparatus of claim 2, wherein the first processing unit and the second processing unit correspond to threads performed in one process.

4. The apparatus of claim 1, wherein the task for verifying an existing database map is a task for identifying whether the existing database map storing the real-time data has been changed or not; and
    the control unit is configured to reuse the existing database map when the existing database map has not been changed, and create a new database map when the existing database map has been changed.

5. The apparatus of claim 4, further comprising a storage unit for storing a database,
    wherein the control unit is configured to store the existing database map and the new database map in the storage unit in a caching technique.

6. The apparatus of claim 1, wherein the task for copying objects is a task for extending the number of objects to correspond to the real-time data and then displaying them to match the object display form; and
    wherein the control unit is configured to connect the real-time data to the objects, respectively, and then display them.

* * * * *